March 6, 1956
C. A. HUGGINS ET AL
2,737,377
GAS-LIQUID CONTACT APPARATUS
Filed Oct. 24, 1951
5 Sheets-Sheet 1
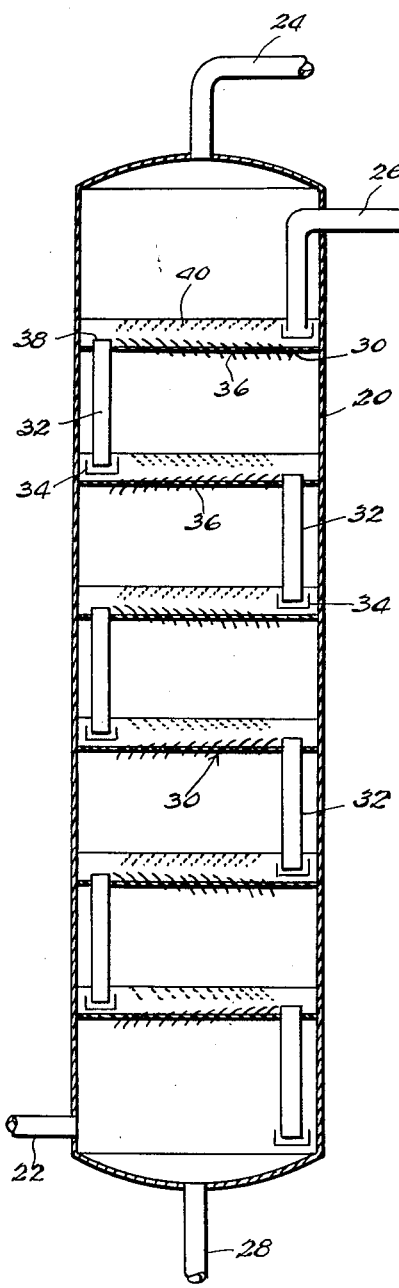
Fig. 1
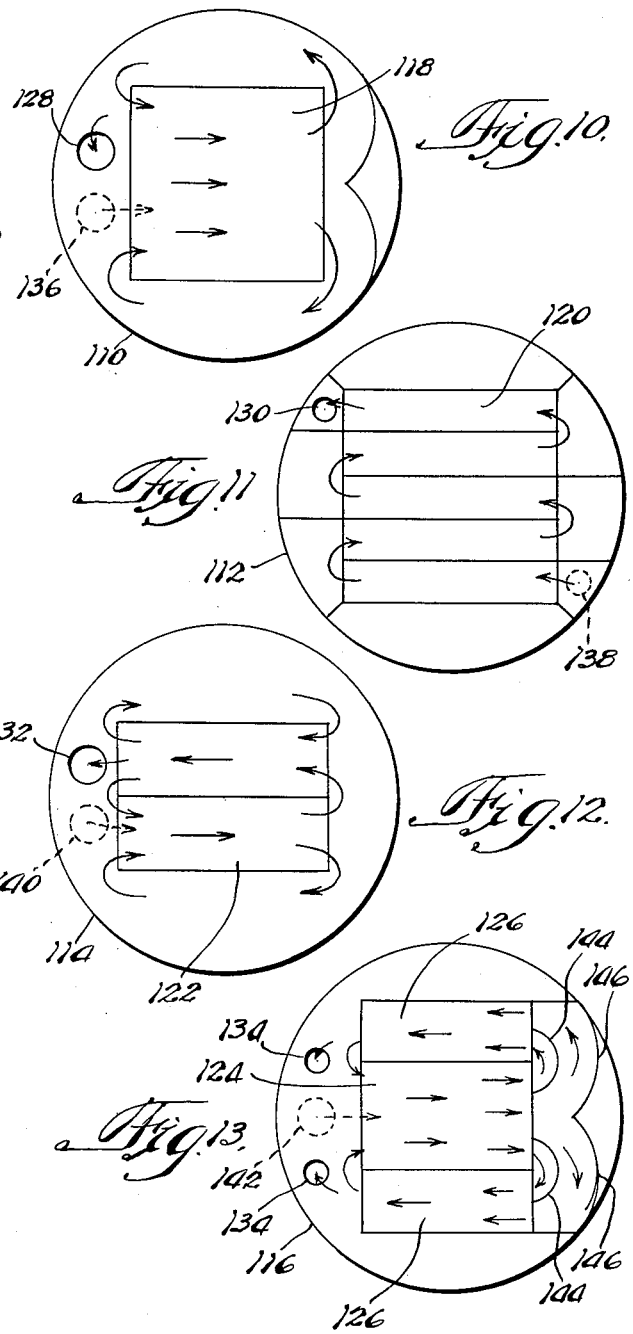
Fig. 10.
Fig. 11
Fig. 12.
Fig. 13.
INVENTORS.
Clifford Andrew Huggins
& Griffin C. Thrift.
By Thiess, Olsen, Mecklenburger
Attys.

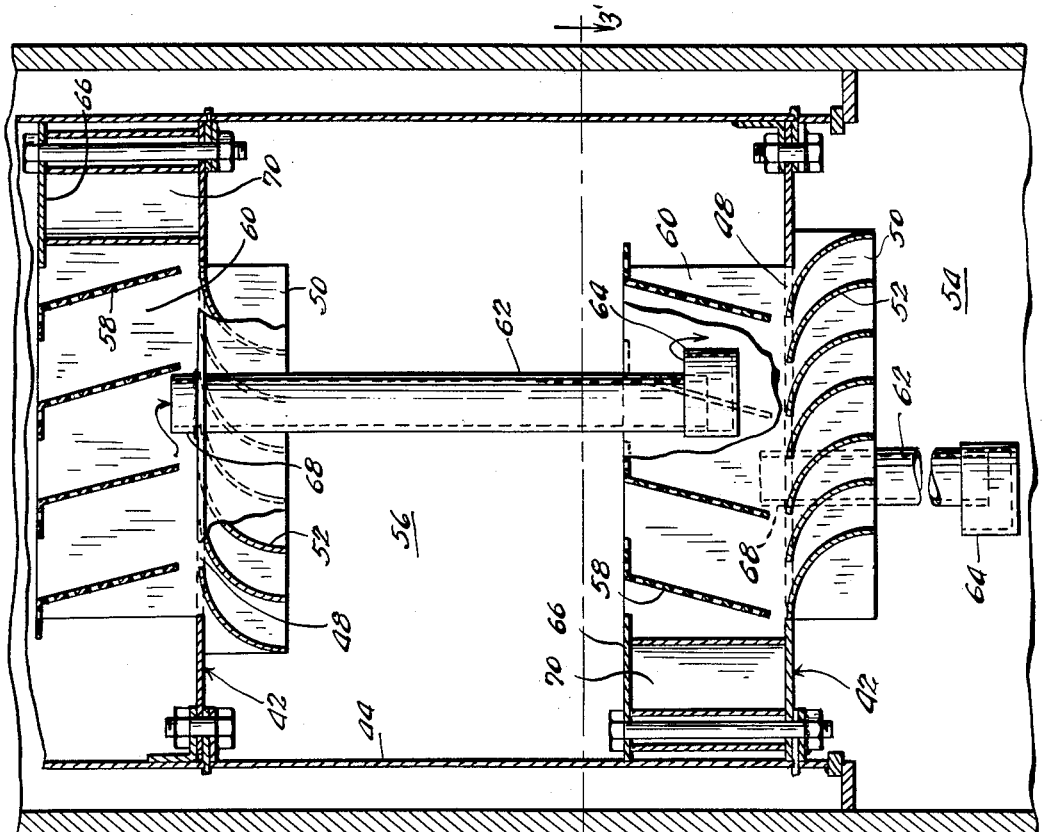

March 6, 1956 — C. A. HUGGINS ET AL — 2,737,377
GAS-LIQUID CONTACT APPARATUS
Filed Oct. 24, 1951 — 5 Sheets-Sheet 3

INVENTORS
Clifford Andrew Huggins
& Griffin C. Thrift

March 6, 1956 C. A. HUGGINS ET AL 2,737,377
GAS-LIQUID CONTACT APPARATUS
Filed Oct. 24, 1951 5 Sheets-Sheet 4

INVENTORS.
Clifford Andrew Huggins &
Griffin C. Thrift.

March 6, 1956  C. A. HUGGINS ET AL  2,737,377
GAS-LIQUID CONTACT APPARATUS
Filed Oct. 24, 1951  5 Sheets-Sheet 5
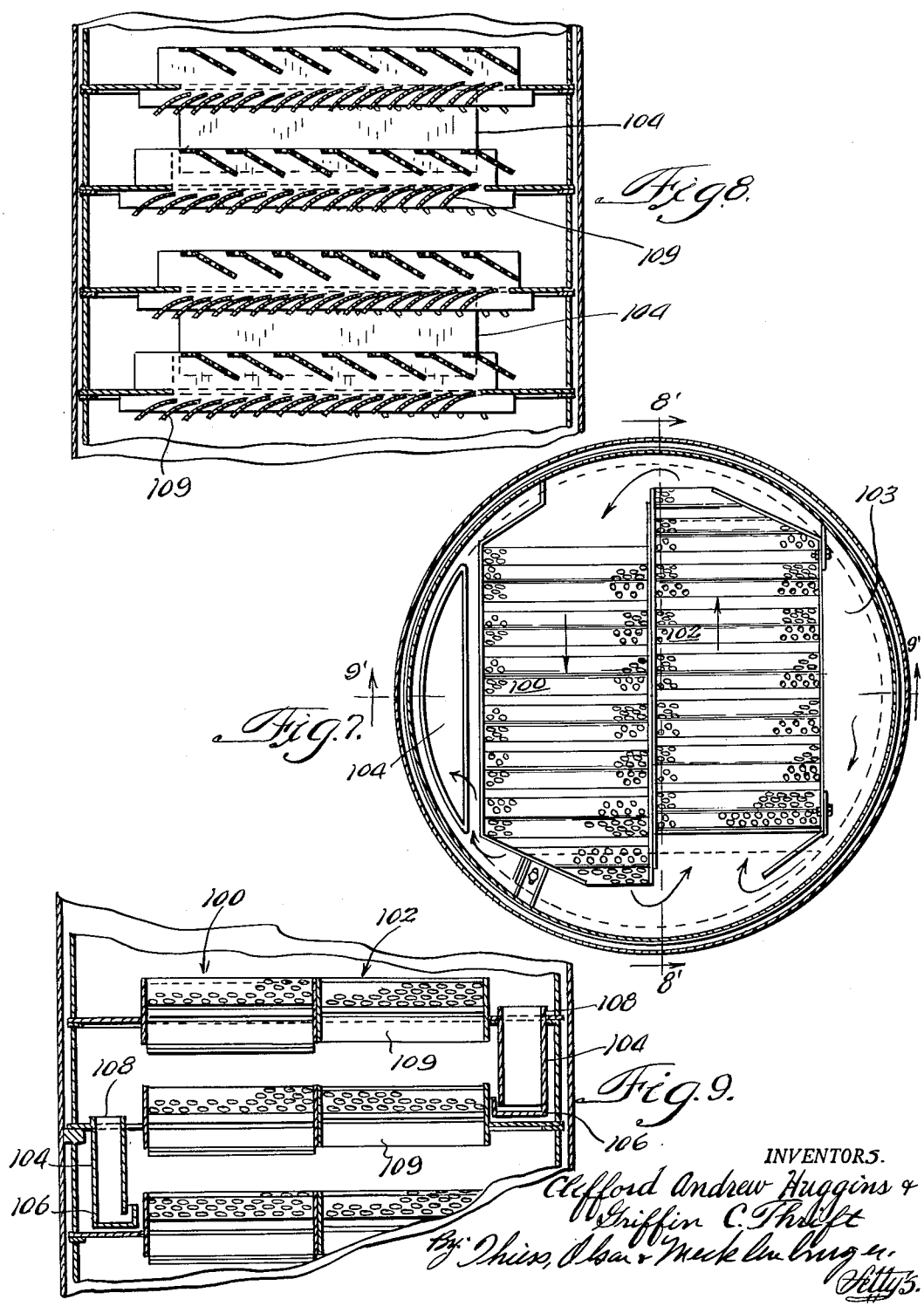

United States Patent Office 2,737,377
Patented Mar. 6, 1956

2,737,377
GAS-LIQUID CONTACT APPARATUS

Clifford Andrew Huggins and Griffin C. Thrift, Wichita, Kans., assignors to Koch Engineering Company, Inc., Wichita, Kans., a corporation of Kansas Application October 24, 1951, Serial No. 252,886

1 Claim. (Cl. 261—114)

This invention relates to a gas-liquid contact apparatus and has for an object provision of apparatus which insures intimate contact at high efficiency between gases and liquids.

In the gas-liquid contact art and particularly in the art of dephlegmation or fractionation, an important consideration is to provide equipment which will permit the liquids and gases or vapors to be thoroughly contacted and then disengaged whereby gases or vapors and liquids are withdrawn from the equipment as separate products. In the past it has been the usual practice to provide a gas-liquid contact chamber or tower including a plurality of transverse trays through which the gases or vapors pass and over which the liquid flows. Such trays known to the art are the usual bubble trays, perforated trays and the like. A particularly efficient tray is one such as disclosed in copending Clifford Andrew Huggins application Serial No. 243,240, filed August 23, 1951. Many of the prior art trays, however, have not been entirely satisfactory since only limited quantities of liquid and gas can be passed through a tray of a given size and since many of the prior art trays are constructed so that an inordinately large pressure drop occurs across each tray.

It is one object of this invention to provide apparatus in which relatively large quantities of liquids and gases may be rapidly and efficiently contacted with each other.

A still further object of this invention is the provision of a process and apparatus for intimately contacting liquids and gases in such a manner that only a small pressure drop occurs across the contacting section.

A still further object of this invention is the provision of apparatus in which the liquid on one tray is successively and repeatedly contacted with a vapor or gas stream prior to the time that it is discharged to a succeeding tray.

A still further object of this invention is the provision of a new and improved apparatus for the fractionation or dephlegmation of liquids, such as petroleum hydrocarbons.

A still further object of this invention is the provision of a gas-liquid contact tray providing for the circumfluent flow of liquid thereacross which is constructed in such a manner that it may be readily installed in the conventional gas-liquid contacting towers or chambers.

A further object of this invention is the provision of a tray construction which may be readily modified to conform to the particular conditions of operation that are desired in the contact device.

Further and additional objects will appear from the following description, the accompanying drawings and the appended claim.

In accordance with one embodiment of this invention, a gas-liquid contact tray has been provided which is constructed in such a manner as to permit the liquid introduced thereon to flow back and forth thereover in a circumfluent manner whereby the liquid is successively contacted a number of times with a stream of gas or vapor passing upwardly through the tray itself. Each tray includes a substantially horizontal surface having an upwardly extending partition means which divides the tray into a first area for movement of liquid across the tray in one direction and a second area for the return movement of liquid across the tray in the other direction. The tray adjacent at least one of the areas is provided with an opening across which extend a plurality of baffle plates which are inclined toward the horizontal in the direction of the normal movement of the liquid through that area. In the operation of the device, gases or vapors pass upwardly through the opening in the tray section and are directed by the baffle plates in a direction having a horizontal component. The gases or vapors are injected onto the tray under the surface of the liquid thereon thereby driving the liquid across the tray in said one area. After the liquid has been driven across the tray it is then diverted and circulated back across the tray through the second area. If desired, the second area may also be provided with an opening having inclined baffles for further driving the liquid back across the tray in the reverse direction.

If desired, the flow of the liquid back and forth across the tray may describe a serpentine path with adjacent areas of movement being provided with openings and slanted baffles in opposite directions. However, it is preferred that the tray be so constructed that a portion of the liquid which has flowed once back and forth across the tray is recycled.

In accordance with a preferred embodiment of this invention the tray is supplied from above by the usual type downcomer having a seal pan associated therewith and the liquid is withdrawn from the tray through a suitable downpour. Surrounding the downpour is preferably a weir member extending above the upper surface of the tray for a substantial distance in order that a pool of liquid of substantial depth is maintained on the tray during use. Preferably the upper edges of at least some of the baffles in the openings are formed to terminate at a point which is below the upper edge of the weir member above the surface of the tray. This construction insures that the vapors or gases passing through the opening through the opening between the baffle plates will be introduced under the surface of the liquid flowing around the tray, thereby permitting thorough contact. It will be understood, of course, as the description proceeds that the apparatus is operated in such a manner that the rate of flow of gases or vapors through the openings and between the baffles is sufficiently rapid so as to prevent the run-back of liquid through the vapor or gas openings onto the tray below.

For a more complete understanding of this invention reference will now be made to the drawings, in which Fig. 1 is a somewhat diagrammatic elevational view taken in section of a fractionating tower in which a tray constructed in accordance with this invention may be installed;

Fig. 2 is a fragmentary broken sectional view of two trays installed in a tower in accordance with one embodiment of this invention;

Fig. 3 is a fragmentary sectional view taken along the line 3'—3' of Fig. 2;

Fig. 6 is another broken sectional view of the device shown in Fig. 4 taken along a broken line which is substantially 90° to that along which Fig. 5 is taken;

Fig. 7 is a plan view of another modified form of tray constructed in accordance with one embodiment of this invention and installed in a tower;

Fig. 8 is an elevational sectional view taken along the line 8'—8' of Fig. 7 and showing a plurality of superimposed trays;

Fig. 9 is also an elevational sectional view taken along the line 9'—9' of Fig. 7 and showing a plurality of superimposed trays; and Figs. 10 through 13 are diagrammatic plan views indicating several types of trays having different circulatory flow of liquid thereacross, all as contemplated within the broad scope of this invention.

Figure 4:
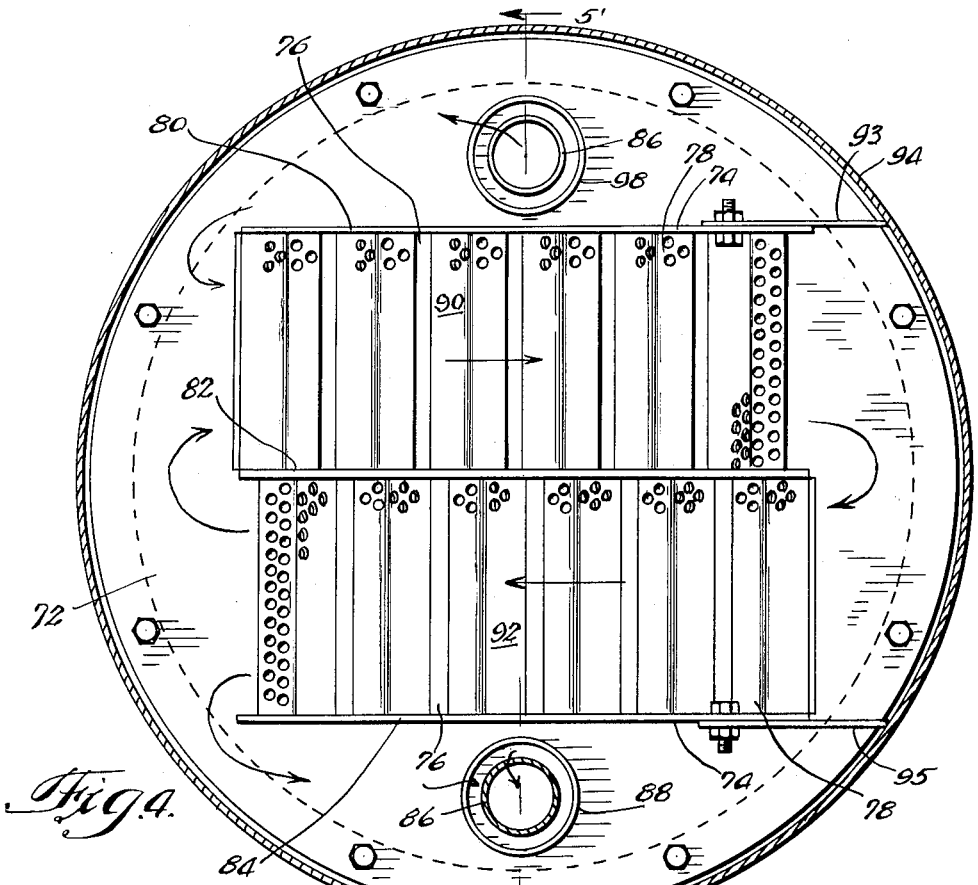
Fig. 4 is a plan view of a tray installed in a tower constructed in accordance with another embodiment of this invention.

With more particular reference to Fig. 1 of the drawings, this invention finds particular utility in the usual type of fractionating tower 20 provided with the usual vapor inlet 22, a vapor outlet 24, a liquid inlet 26 and a liquid outlet 28. The tower 20 is equipped with a plurality of horizontal vertically spaced circumfluent flow trays 30, the specific structure of which may take a form which will be elucidated more fully below. Associated with each of the trays is a suitable downcomer 32 for conveying the liquid from one tray to the tray below. Each downcomer terminates in a seal pan 34 which prevents the flow of vapor upwardly through the downcomer 32. As will be hereinafter more fully pointed out, the trays 30 are provided with openings across which are secured a plurality of spaced baffle plates 36 which serve to impart a horizontal component of movement to the vapors passing upwardly through the tray 30. A tray having baffles of this character is disclosed in application Serial No. 243,240 referred to above. A pool of liquid of substantial depth is maintained on the upper surface of each tray 30 by virtue of an upper portion 38 of each downcomer 32 extending for a substantial distance above the upper surface of the tray 30. Thus the vapors or gases passing upwardly and then horizontally between the baffles 36 are discharged into the pool of liquid under the surface thereof and the vapors or gases serve to boost or thrust the liquid across the tray. This permits of very intimate contact between the liquid and the gases. Suitable gas-disengaging means which may take the form of a plurality of upwardly extending screens or perforated plates 40 are provided above the baffles 36. As will be hereinafter more clearly pointed out, when the liquid has made one trip across the tray in the manner described, at least a portion of it is again flowed back across the tray either for recycling over the baffles 36 or for passage over another similar contact area in the same manner as above described. Thus a tray has been provided in which the liquid moves back and forth thereacross and is passed a plurality of times into contact with gases or vapors flowing upwardly from a contact zone below.

Referring now more particularly to the embodiment shown in Figs. 2 and 3, there is shown in detail a pair of vertically spaced horizontal contact trays 42 supported within a cylindrical casing 44 which in turn is supported in a tower 46 which may take the form of the tower shown in Fig. 1. The trays 42 each include a peripheral area which is substantially flat and is adapted to support a pool of liquid thereon. The central area of each tray 42 is provided with an enlarged opening 48 which in this instance is rectangular in cross section. Secured to opposite sides of the opening 48 and depending from the tray are a pair of plates 50 between the opposing faces of which are welded or otherwise secured a plurality of curved baffles 52. It will be noted that the upper edges of the curved baffles provide a plurality of elongated openings in the upper surface of each tray which extend transversely of the opening 48 between the plates 50. The upper surfaces of the baffle plates 52 are inclined toward the horizontal so that any vapors or gases passing upwardly from a lower zone 54 to an upper zone 56 above the lower tray 42 (Fig. 2) will flow in a direction having a horizontal component of movement at the time the vapors reach the upper surface of the tray 42. On each tray are provided suitable perforated gas-liquid disengaging plates 58 secured above the opening 48 and the baffle plates 52 between a pair of end plates 60 for the purposes disclosed in said copending application Serial No. 243,240.

Liquid is supplied to each tray 42 through a pair of downcomers 62 leading from the corresponding tray above. A seal pan 64 is provided at the outlet of each downcomer 62 in order to prevent the flow of vapors upwardly through the downcomer in accordance with the usual practice. Each downcomer 62 extends through a suitable aperture in a flat portion of the tray 42 and provides a downpour for that tray. It will be noted from Fig. 3 that there are two downcomers and two downpours for each tray and that successive trays 42 in the tower are identical except that each one is rotated 180° about a vertical axis with respect to the one above and below it when placed in position within the tower. The downcomers 62 each have an upper end 68 which extends above the surface of the tray 42 thus forming a weir which permits the accumulation of a pool of liquid having a substantial depth on the surface of each tray, it being borne in mind that liquid cannot flow downwardly through the openings 48 due to the high velocity of gases or vapors passing therethrough. It will be further noted that the upper longitudinal edges of the baffles 52 terminate below the top edge of the weir member 68 whereby gases or vapors passing between the baffles are injected under the surface of the liquid supported on the tray 42.

In the operation of the device shown in Figs. 2 and 3, liquid to be contacted with gas or vapor is passed onto a tray 42 through the downcomer 62 and seal pan 64 spaced above it. At the same time vapors pass at high velocity upwardly through the opening 48 and between the baffle elements 52. When a substantial pool of liquid has accumulated on the tray 42 the vapors pass under the surface of the liquid and thrust the liquid in the direction of the arrows shown in Fig. 3 across the contact area defined by the opening 48 and against a pair of upwardly extending oppositely curved baffles 70 whereupon the liquid stream is divided and flowed back on either side of the opening. The curved baffles 70 are positioned beneath a horizontal plate 66 which acts to retain the liquid in the lower portion of the space above the tray. The liquid returns by paths on either side of the opening 42 and between the partitions 60 and the casing 44 past the downcomers 62 and again into the contact area. Thus the liquid is cycled back and forth across the tray in a circulatory motion and is subject to a plurality of contacts with vapor passing upwardly from a tray below. As liquid accumulates on the tray it is withdrawn through the downcomers 62 after flowing over the weir 68. Vapors, after being disengaged from the liquid by the perforated plates 58, continue their travel upwardly through the next tray 42, above.

Thus means have been provided for imparting a circulatory motion to the liquid on each tray and the liquid is recycled through the contact area on the tray a number of times in order to permit the desired contact with the gases from below. It will be noted that the movement of liquid on the flat peripheral supporting sections of each tray is such that the liquid from the seal pan will pass over the contact area defined by the opening 48 at least once before it will have an opportunity to flow to the tray below through the downpour 66. The end plates 60 serve to partition the tray into areas across which the liquid flows in a confined path.

Figure 5:
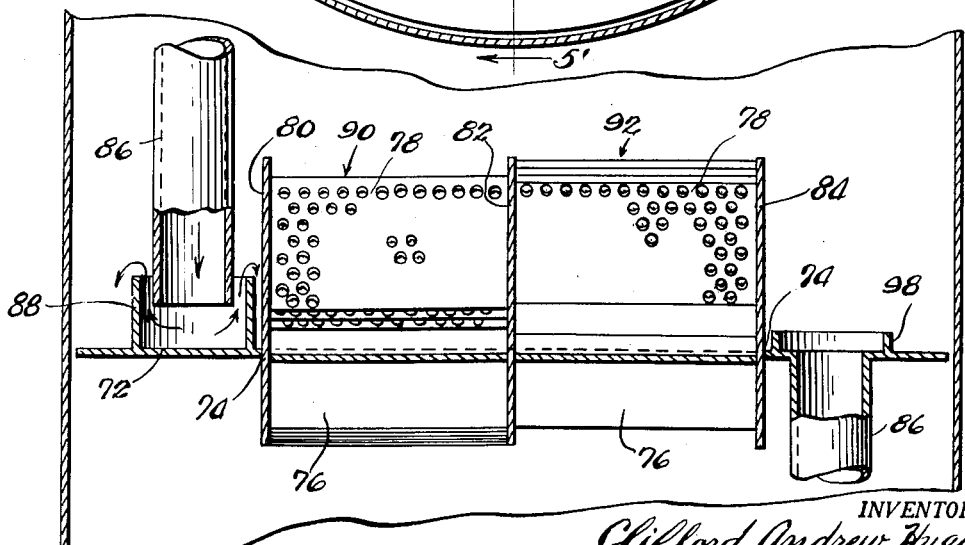
Fig. 5 is a sectional view taken along the line 5'—5' of Fig. 4.
Figure 6:
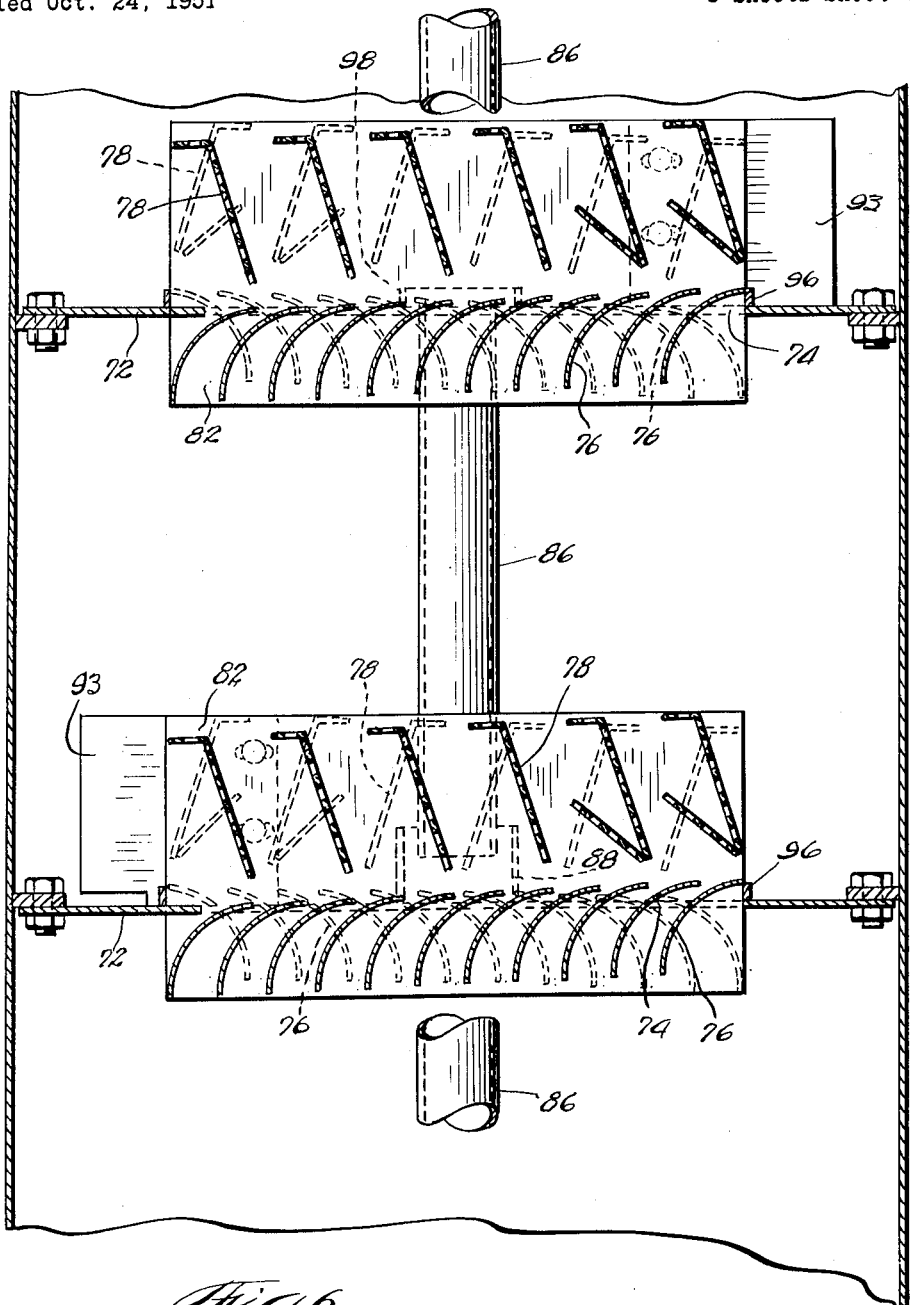

With reference to Figs. 4, 5 and 6, there is disclosed a contact tower having a plurality of horizontal contact trays 72 each of which includes a pair of gas-liquid contact areas. In this modification each tary 72 is provided with a pair of openings 74 in side-by-side relationship in a central section of the tray defining the contact areas. Each of the openings is provided with transversely extending curved baffles 76 of the character of baffles 52 previously described and with gas-liquid disengaging perforated plates 78. The baffles 76 and the plates 78 are supported between plates 80, 82 and 84 which extend vertically above and below the surface of the tray 72 and serve as partitions for dividing the tray into the several areas of movement of the liquid thereover. The baffles 76 in the adjacent contact areas are arranged to discharge gases or vapors therethrough in opposite directions. In this modification only one downcomer 86 is provided for each tray and the downcomer serves as a downpour for the tray next above. As indicated by the arrows in Fig. 4, the liquid flows onto the flat surface of the tray 72 through the downcomer 86 and a seal pan 88 and around the partition 80 to the first gas-liquid contact area 90. After traversing this contact area in the manner indicated above wherein vapors passing between the baffles 76 serve to impart a horizontal thrust to the liquid, the latter is flowed around to the second contact area 92 wherein it is thrust in the opposite direction to the other side of the tray. At this point a portion of the liquid will be recycled back to the section 90 and another portion will find its way as indicated by the arrows to the next downpour 86 from which it is discharged to a succeeding tray below. Thus the partitions 80, 82 and 84, together with the walls of the tower define the circumfluent path of the liquid moving back and forth across each tray 72. It will also be noted that partitions 80 and 84 are extended to the side walls of the tower at one end by plates 93 and 95 in order to insure that liquid passed over contact area 90 will be circulated back across the tray over contact area 92.

In the modification shown in Figs. 4, 5 and 6, it will be noted that the upper edges of the baffle plates 76 are successively stepped upwardly in the direction of movement of the liquid over that area. This is advantageous since the liquid has a tendency to pile up on the contact section as it is moving thereacross and more uniform contact over the whole of the tray may be achieved if this stepped relationship is provided. It will be noted that a bar 96 secured between the upper surface of the tray 72 and the last baffle plate 76 in the series is provided which tends to prevent the run-back of liquid from the tray. The only means of escape for the liquid when the vapors are passing upwardly at a proper velocity is over a weir member 98 which is associated with the upper end of the corresponding downpour 86. The upper edge of the weir member is vertically spaced above the tray so that a pool of liquid will be maintained thereon and the lowermost baffles 76 have edges which are vertically spaced below the top edge of the weir member for the reasons pointed out above.

The structure shown in Figs. 7, 8 and 9 is similar to that shown in Figs. 4, 5 and 6 except with respect to the specific structure of the curved baffle plates, the perforated screens, the downcomers and downpours and the partitioning means. These elements are sufficiently shown in the drawing and it is not believed to be necessary to describe them in detail here. Suffice it to say that the liquid on the tray moves substantially as indicated by arrows in Fig. 7, there being provided two gas-liquid contact zones or areas 100 and 102 through which liquid is moved in opposite directions from one side of the tray to the other. A portion of the liquid from the second contact zone 100 is recycled to the first contact zone 102 as will be understood. The downpour and downcomer in this form of the device takes the shape of an elongated mouth 104 which is provided with a seal pan 106 and a suitable upper weir member 108 as will be understood. The baffles 109 are successively stepped upwardly and the top edges are all vertically spaced below the top edge of the weir 108. The operation of this device is substantially the same as indicated above in connection with the embodiment shown in Figs. 4, 5 and 6.

With reference to Figs. 10, 11, 12 and 13, these are diagrammatic showings of other means for constructing and operating a circumfluent tray in accordance with the broad aspects of this invention. In these drawings the large circles 110, 112, 114 and 116 represent the trays themselves installed in a tower and the rectangular outlines 118, 120, 122, 124 and 126 each represent gas-liquid contact areas containing the above-described inclined baffles for imparting a thrust to the liquid as it moves across the tray in the direction shown by the arrows. The full line small circles 128, 130, 132 and 134 indicate the downpours from the tray while the small dotted line circles 136, 138, 140 and 142 indicate the downcomers and seal pans from the trays above. It will be noted from Fig. 10 that the circulation there set up is similar to that disclosed in the device shown in Figs. 2 and 3, there being continuous recycle of the liquid on the tray but only one area in which a thrust is imparted to the liquid. Fig. 11 discloses a structure providing for a serpentine motion of the liquid back and forth across the tray with no recycle except in so far as may be incidentally achieved by liquid flowing over the partitions which divide one contact area from the other. Fig. 12 depicts a flow which is somewhat similar to that shown in the modification of Figs. 4, 5 and 6 except that the downcomer and downpour are differently positioned and the flat areas of the tray laterally spaced from the contact areas are also used as part of the path for recycling liquid back to the contact area. In this instance (as in Fig. 11) there are two contact areas 122 arranged in side-by-side relationship which thrust the liquid in opposite directions. Fig. 13 depicts a flow which is somewhat similar to that shown in Fig. 12 except that there is an enlarged central contact area 124 for thrusting the liquid in one direction and two smaller contact areas 126 on either side thereof for thrusting the liquid back in an opposite direction. Two pairs of vertical baffles 144 and 146 are preferably provided in order to insure a uniform depth of liquid passing over all sections of each of the contact areas, these being similar in structure to baffles 70 shown in Figs. 2 and 3.

It will be understood from the foregoing considerations that a tray has been provided which is very efficient in operation and which will permit the passage of a liquid back and forth across a tray for an indefinite or any desired number of times. This repeated passage may be effected either by recycling or by movement in a serpentine path or by both. Each time the liquid crosses the tray it may or may not be subjected to the thrust of vapors from below. A particular feature of the invention is that vapors from below provide this circulatory motion and the device in which the tray is installed is capable of producing very efficient gas-liquid contact, particularly in instances where large volumes of liquid are to be contacted thoroughly with a relatively large volume of gas or vapor.

While several particular embodiments of this invention are shown above, it will be understood, of course, that the invention is not to be limited thereto, since many modifications may be made, and it is contemplated, therefore, by the appended claim, to cover any such modifications as fall within the true spirit and scope of this invention.

We claim:

A gas-liquid contact device comprising a substantially horizontal, flat tray having an upper liquid-supporting surface, means defining an aperture in said surface providing a liquid downpour therefrom, a weir member surrounding said aperture for maintaining a pool of a predetermined average depth on said surface, partition means on said upper surface for defining a first area for movement of liquid across said tray in one direction and a second area for return movement of liquid across said tray in another direction, said tray having an opening adjacent one of said areas, said opening having a plurality of baffle elements extending transversely thereof defining a plurality of parallel elongated apertures each extending substantially entirely across said opening spaced in the direction of the movement of liquid through said area, said baffle elements having their upper portions inclined toward the horizontal whereby gases passed upwardly through said opening are diverted in said direction of liquid movement in said one area, the upper edge of said weir above said upper surface being substantially higher than at least some of said upper edges of said baffle elements, and the upper edge portions of said baffle elements increasing in height progressively in the direction of movement of liquid across the adjacent area.

References Cited in the file of this patent

UNITED STATES PATENTS

| | | |
|---|---|---|
| 243,297 | Perin | June 21, 1881 |
| 581,439 | Sneath | Apr. 27, 1897 |
| 829,700 | Drees | Aug. 28, 1906 |
| 1,608,416 | Newton | Nov. 23, 1926 |
| 1,773,258 | Campbell | Aug. 19, 1930 |
| 1,986,431 | Gray | Jan. 1, 1935 |
| 2,091,349 | Bergman | Aug. 31, 1937 |
| 2,333,193 | Persson et al. | Nov. 2, 1943 |
| 2,568,749 | Kittel | Sept. 25, 1951 |
| 2,693,949 | Huggins | Nov. 9, 1954 |

FOREIGN PATENTS

| | | |
|---|---|---|
| 497,599 | Belgium | Sept. 15, 1950 |
| 951,153 | France | Apr. 11, 1949 |